H. N. PACKARD.
FLUID METER.
APPLICATION FILED FEB. 9, 1918.

1,321,546.

Patented Nov. 11, 1919.

Inventor:
Horace N. Packard
by Edwin B. H. Tower, Jr.
Atty.

UNITED STATES PATENT OFFICE.

HORACE N. PACKARD, OF MILWAUKEE, WISCONSIN, ASSIGNOR TO THE CUTLER-HAMMER MFG. CO., OF MILWAUKEE, WISCONSIN, A CORPORATION OF WISCONSIN.

FLUID-METER.

1,321,546.     Specification of Letters Patent.     Patented Nov. 11, 1919.

Application filed February 9, 1918. Serial No. 216,226.

*To all whom it may concern:*

Be it known that I, HORACE N. PACKARD, a citizen of the United States, residing at Milwaukee, in the county of Milwaukee and State of Wisconsin, have invented new and useful Improvements in Fluid-Meters, of which the following is a specification.

This invention relates to fluid meters.

It relates particularly to meters for measuring the rate of flow of fluids, by imparting heat thereto and determining either the effect of the imparted heat on the fluid or the cooling effect of the fluid on the heater.

Meters of this type generally have an electric heater to impart heat to the fluid, and one or more electric resistance thermometers to measure the temperature thereof.

The location of the resistance thermometer or thermometers, relative to the heater, is usually such that the thermometers are affected by the radiant energy from the heater.

This radiant energy may affect the temperature of the thermometer without correspondingly affecting the temperature of the transparent medium of gas or other fluid through which the rays pass. Errors may thus be introduced in the reading of the meter.

In the patent to John C. Wilson, No. 1,257,568, of Feb. 26, 1918, means are shown for preventing errors in the reading of the meter due to the effects of the energy that radiates from the heater. This means, in the embodiment shown in said patent, comprises a ray screen located between the heater and each thermometer resistance to obstruct and absorb the rays from the heater, and to impart the absorbed heat to the fluid. The screens are so constructed that they will obstruct and absorb substantially all of the heat rays without materially obstructing the flow of the fluid.

It has been found in practice that the thermometer resistance may be affected by radiant energy from other sources than the heater. For instance,—the walls of the conduit may, under certain conditions, be hotter or colder than the fluid. Heat energy may therefore be radiated from the walls of the conduit at a point beyond the thermometer resistance, and the rays may be directed on the unprotected side of the thermometer resistance. According to this invention, the means for obstructing and absorbing the heat rays serves to absorb the heat rays coming from either direction, and therefore serves to protect both sides of the thermometer resistance. Under these conditions the thermometer resistance will be protected from the heat rays that are radiated from any source, whether the source be the electric heater or the walls of the conduit.

The object of this invention is to provide a meter in which errors, due to the effects of radiant energy from any source whatsoever, will be prevented.

Before describing the meter, the action of radiant energy will be briefly explained.

Radiant energy is transmitted in all directions from a source of heat. These rays may pass through a medium such as a gas without producing any apparent effect on the gas. If the surface of the thermometer resistance, or other object in the path of the rays, is a perfect reflecting surface, all of the rays will be reflected, and none will be absorbed. Under these conditions the temperature of the thermometer will not be affected. If, on the other hand, the surface of the thermometer resistance is a perfect absorbing surface, the rays will be absorbed and none will be reflected. In the latter case, the temperature of the thermometer resistance will be raised. Under practical conditions the surface of the thermometer resistance is neither a perfect reflecting nor a perfect absorbing surface. Furthermore, the ray absorbing and reflecting properties of the thermometer resistance may change, due to the deposits of tar, naphthalene, and the like, from the gas.

If the rays strike some obstructing surface between the heater and the thermometer resistance, a substantial portion of the heat energy will be absorbed and transmitted to the gas to raise the temperature thereof. The heat energy will then be used for the purpose for which it is intended. If all the rays were absorbed without directly striking the thermometer resistance, and the absorbed heat dissipated to the fluid or gas, an ideal condition would be obtained.

As above stated, means are shown in the aforesaid application for absorbing the rays from the heater before they reach the thermometer resistance. The meter herein described has means for absorbing the rays not only from the heater, but also from other sources adjacent to the thermometer resistance. This means then transmits the heat energy to the gas.

The meter herein shown is of the type commonly known as a Thomas meter. A meter of this type may comprise an electric heater for imparting heat to the fluid, and one or more thermometer resistances whereby the effect of the heat transfer on the fluid, or the effect of the heat transfer on the heater, may be utilized in determining the rate of flow of the fluid. In the present instance, the meter is provided with a heater and a thermometer resistance located at each side of the heater. In practice, the heater and thermometer resistance are connected with automatic mechanism of the type shown in the patent to C. C. Thomas, No. 1,222,492, of April 10, 1917, so that the thermometer resistances will act through a galvanometer to automatically vary the current supplied to the heater, in order to maintain a constant temperature rise of the fluid between the points where the thermometer resistances are located. The energy consumed by the electric heater in maintaining this constant temperature rise will then be an indication of the rate of flow of the fluid. The mechanism connected with the heater and thermometer resistances forms no part of the present invention, and therefore this mechanism has not been shown.

The accompanying drawing illustrates, in a somewhat diagrammatic way, only the housing of the meter, and the heater and thermometer resistances located therein.

In the drawing Figure 1 is a vertical section of the meter housing showing one type of ray absorbing means associated with the thermometer resistances.

Figure 1:
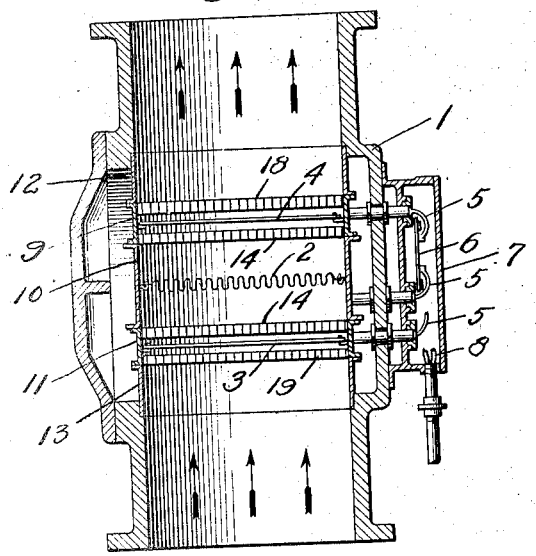
Figure 2:
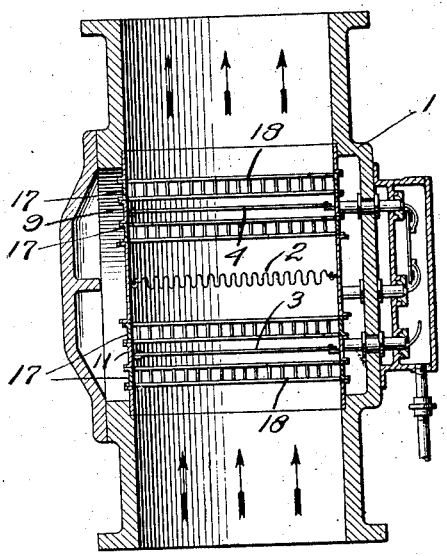
Fig. 2 is a vertical section of a meter showing a different type of ray absorbing means associated with the thermometer resistances.

For the present purpose, it is sufficient to note that the portion of the meter shown in Figs. 1 and 2 comprises a housing 1 which is adapted to be connected in the gas main through which flows the fluid to be measured. Positioned in the housing is an electric heater 2 for imparting heat to the fluid. At the entrance side of the heater 2 is a thermometer resistance 3, and at the exit side of the heater 2 there is a similar thermometer resistance 4. All of the resistances are connected by means of suitable leads 5 to a panel board 6 located in the terminal housing 7. Proper electrical connections may be made between the terminal board 6 and the other mechanism of the meter (not shown) by the conductors 8.

The thermometer resistance 4 is mounted in a tubular frame 9. The heater 2 and thermometer resistance 3 are mounted in similar tubular frames 10 and 11 respectively. These tubular frames, together with the end frames 12 and 13, go to make up a passage or conduit through which the fluid to be measured flows.

Figure 3:
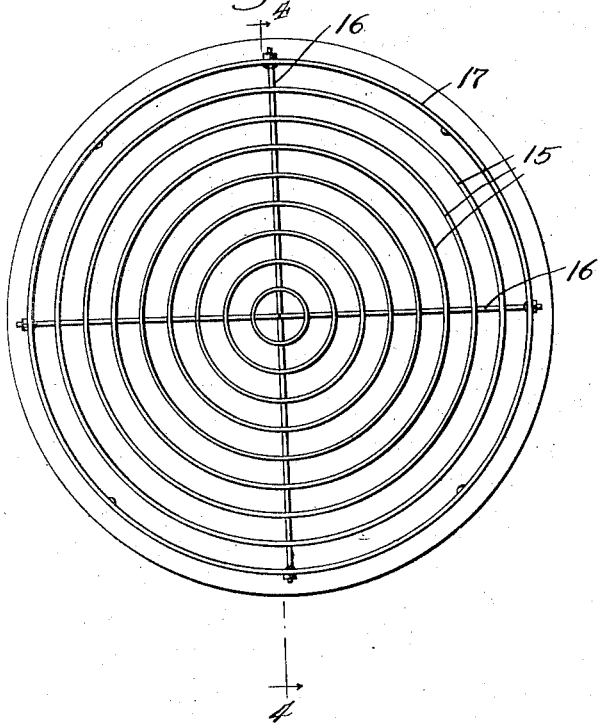
Fig. 3 is a front elevation of one of the ray screens shown in Fig. 2 for absorbing the rays.
Figure 4:
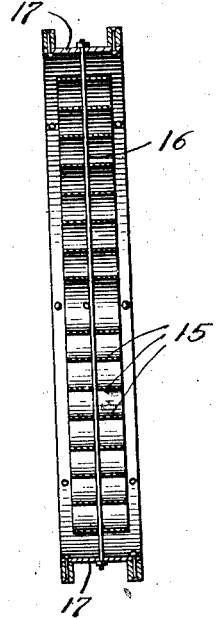
Fig. 4 is a vertical section of the ray screen taken on line 4—4 of Fig. 3.

A ray screen 14 is positioned between the heater 2 and each thermometer resistance. These ray screens are constructed in the same manner, and are positioned in the same place as the corresponding ray screens shown in the aforesaid patent to John C. Wilson. So far as the present invention is concerned their specific construction is immaterial. One type of screen disclosed in the Wilson patent is shown in Figs. 3 and 4. It comprises a plurality of concentric circular strips of metal 15. These circular strips of metal may be held in position by any suitable means, such as the cross rods or bolts 16. In the meter shown in Fig. 1 the circular strips 15 are associated directly with the tubular frame that carries the thermometer resistance, whereas in Fig. 2 the circular strips 15 are mounted in separate tubular frames 17. It is this type of ray screen that is shown in detail in Figs. 3 and 4. By constructing the ray screen in this manner it will be noted that the entire screen structure constitutes a separate unit which may be inserted between the tubular frame carrying the thermometer resistance and the tubular frame carrying the heater resistance.

The structure so far described is substantially the same as that in the aforesaid Wilson patent, and the screens serve to obstruct and absorb the rays in the manner described in said patent. In order that the function of the screens may be clearly understood, the manner in which the screens intercept and absorb the rays will be herein briefly repeated.

The concentric strips 15 form relatively long narrow passages which do not materially interfere with, or obstruct, the flow of the fluid. Nearly all the heat rays which pass at an angle to the direction of flow of the fluid will strike one of the circular strips 15 of one of the ray screens, and therefore be obstructed and absorbed. However, the screens do not obstruct the rays which lie substantially parallel with the direction of the flow of the fluid, but any errors which may be produced by not absorbing these comparatively few rays is negligible. The greater part of the rays emanating from the heater will strike and be absorbed by one of the strips 15 of one of the ray screens, and only the rays which lie parallel to the direction of the flow of the fluid will pass through the screen unobstructed. The heat energy which is thus absorbed by the screens is transmitted to the flowing fluid.

Of course, the ray screens may be constructed in various other ways to obtain the same results. For instance,—a modification shown in the aforesaid Wilson patent comprises strips of metal passing across the conduit transversely in two directions so as to provide a large number of rectangular tubular openings or passages. The strips of metal or other material forming these passages, perform the same function of obstructing and absorbing the heat rays as do the circular strips herein shown.

It has been found in practice that if the walls of the conduit are hotter than the fluid, heat will be radiated from the walls of the conduit to the fluid. Under these circumstances, heat energy will be radiated toward the outer side of the thermometer resistance 4, and toward the outer side of the thermometer resistance 3 from the walls of the conduit. Heat rays may therefore be directed on the unprotected side of the thermometer resistance 3, and on the unprotected side of the thermometer resistance 4 from the walls of the conduit. In other words, the walls of the conduit, in advance of the thermometer resistance 3, may radiate heat energy toward the under side of the thermometer resistance 3, and the walls of the conduit beyond the thermometer resistance 4 may radiate heat energy toward the upper side of this thermometer resistance.

In order to protect the thermometer resistances from heat rays emanating from such sources as just described, an additional ray screen 18 is associated with the thermometer resistance 4 at the side which is opposite to the side at which the screen 14 is located. Likewise, an additional ray screen 19 is associated with the thermometer resistance 3 at the side which is opposite to the side at which the corresponding screen 14 is located.

In Fig. 1 these additional screens are associated with the tubular frames which carry the thermometer resistances in the same manner that the ray screens 14 are associated therewith.

In Fig. 2 the additional ray screens constitute separate units just as the other ray screens constitute separate units in this figure.

The additional ray screens obstruct and absorb the rays directed toward the upper side of the thermometer resistance 4, and directed toward the lower side of the thermometer resistance 3 in the same manner that the ray screens 14 intercept and absorb the rays directed toward the inner side of the thermometer resistances.

It will now be seen that by positioning ray screens at both sides of each thermometer resistance the thermometer resistance is protected from heat rays directed toward either side of the thermometer resistance, and emanating from any source whatsoever adjacent to the thermometer resistance. The two ray screens of each thermometer resistance therefore constitute means for protecting the thermometer resistance from heat rays emanating from any source, whether this source be the heater or some source such as the walls of the conduit. A meter has therefore been provided in which errors due to radiant energy effects from practically any source whatsoever are eliminated.

What I claim is:

1. A fluid meter comprising a conduit, a heater and a temperature responsive element located in said conduit, and means to protect the temperature responsive element from radiant energy directed toward either side of the temperature responsive element.

2. A fluid meter comprising a conduit, a heater and a temperature responsive element located in said conduit, and means to prevent the temperature responsive element from being affected directly by radiant energy from sources at either side of said element.

3. A fluid meter comprising a conduit, a heater and a temperature responsive element located therein, means to protect that side of the temperature responsive element which is adjacent to the heater from the radiant energy from the heater, and means to protect the other side of said element from radiant energy from the walls of the conduit.

4. A fluid meter comprising a conduit, a heater and a temperature responsive element located therein, and a ray screen located at each side of said temperature responsive element for obstructing and absorbing radiant energy before it reaches said element, said screens offering no material obstruction to the flow of the fluid.

5. A fluid meter comprising a conduit, a temperature responsive element located therein and ray screens located on opposite sides of said element to protect the same from radiant energy directed toward either side thereof, each of said screens comprising a plurality of relatively thin strips disposed in said conduit with their surfaces of maximum area substantially parallel to the direction of flow of fluid through said conduit.

6. A fluid meter comprising a conduit, a temperature responsive element located therein and ray screens located on opposite sides of said element to protect the same from radiant energy directed toward either side thereof, each of said screens comprising a plurality of concentrically arranged rings formed of relatively thin material and disposed in said conduit with their surfaces of maximum area substantially parallel to the direction of flow of fluid through said conduit.

7. The method of preventing a temperature responsive element located in a stream of fluid being affected directly by rays from sources of radiant energy at either side of said element, which consists in absorbing the rays at each side of said element before they reach the temperature responsive element.

In witness whereof, I have hereunto subscribed my name.

HORACE N. PACKARD.